(12) United States Patent
Monsa Chermon et al.

(10) Patent No.: US 12,323,285 B2
(45) Date of Patent: ***Jun. 3, 2025

(54) DETECTION OF REPETITIVE DATA SIGNALS

(71) Applicant: D-FEND SOLUTIONS AD LTD., Raanana (IL)

(72) Inventors: Assaf Monsa Chermon, Kfar Yedida (IL); Hanan Leizerovich, Petah Tikva (IL)

(73) Assignee: D-FEND SOLUTIONS AD LTD., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,652

(22) Filed: May 23, 2022

(65) Prior Publication Data

US 2022/0337467 A1 Oct. 20, 2022

Related U.S. Application Data

(63) Continuation of application No. 17/219,780, filed on Mar. 31, 2021, now Pat. No. 11,539,568.

(30) Foreign Application Priority Data

Aug. 12, 2020 (IL) .......................................... 276678

(51) Int. Cl.
*H04L 27/26* (2006.01)
*H04B 1/10* (2006.01)
*H04L 1/00* (2006.01)

(52) U.S. Cl.
CPC ....... *H04L 27/2656* (2013.01); *H04B 1/1027* (2013.01); *H04L 1/0054* (2013.01)

(58) Field of Classification Search
CPC . H04L 27/2655; H04L 27/2656; H04L 27/04; H04L 27/08; H04L 25/02;
(Continued)

(56) References Cited

U.S. PATENT DOCUMENTS 8,989,321 B1   3/2015  Zhou et al.
11,539,568 B2 * 12/2022 Chermon ................ H04L 25/06
(Continued)

FOREIGN PATENT DOCUMENTS

CN   101286925 B   8/2011
JP   2016534613 B   3/2019

*Primary Examiner* — Betsy Deppe
(74) *Attorney, Agent, or Firm* — Reches Patents

(57) ABSTRACT

A method of detecting repetitive information in data packets communicated between a first node and a second node over a wireless network. The method includes (i) collecting samples of a data communication signal transmitted between said first node and said second node over said wireless network at a plurality of respective times; (ii) grouping said collected samples into a plurality of sequences of samples; (iii) combining said plurality of sequences of samples into at least one united signal; the combining includes detecting a respective data packet for each one of said plurality of sequences of samples; and (iv) based on an analysis of said at least one united signal, providing a signal indicative of repetitive information in a plurality of data packets carried by said data communication signal.

24 Claims, 5 Drawing Sheets

(58) Field of Classification Search
CPC .......... H04B 1/06; H04B 1/10; H04B 1/1027; H04B 1/16
See application file for complete search history.

(56) References Cited

U.S. PATENT DOCUMENTS

| | | |
|---|---|---|
| 2003/0190922 A1 | 10/2003 | Dalvi et al. |
| 2017/0279472 A1 | 9/2017 | Wong et al. |
| 2018/0098252 A1 | 4/2018 | Sahai et al. |
| 2018/0176889 A1 | 6/2018 | Chan et al. |
| 2018/0234218 A1 | 8/2018 | Morioka et al. |

* cited by examiner

DETECTION OF REPETITIVE DATA SIGNALS

CROSS REFERENCE

This application is a continuation of U.S. patent application Ser. No. 17/219,780 filing date Mar. 31, 2021 now U.S. patent Ser. No. 11/539,568 grant date Dec. 27, 2022 which claims priority from Israeli patent application 276678 filing date 12 Aug. 2020 which is incorporated herein by reference.

FIELD AND BACKGROUND OF THE INVENTION

The present invention, in some embodiments thereof, relates to detecting repetitive information in a data signal and, more specifically, but not exclusively, to detecting repetitive information in data packets.

In wireless data communications the ability to extract the data from a received signal is highly dependent on the signal to noise ratio (SNR) of the received signal. Many factors may cause low SNR at the receiver, such as a large distance between the reception side and the transmission side and/or high interference at the reception side. In low SNR conditions it may be impossible to extract the data (e.g. data packets) from the received signal.

In some cases, it is desired to detect portions of a data signal which repeat in multiple packets or even in all packets. An example of such a repetition is illustrated in FIG. 1 in which the same bit sequence repeats at the same bit location in all of data packets 1–N.

For example, a source address and/or destination address may repeat in multiple packets transferred between the same source and the same destination. The source address and the destination address are typically located in the same bit locations within the packet. When the rate and coding modulation scheme are kept constant, the address symbols are even kept in the same location within the packet signal. For example, in orthogonal frequency-division multiplexing (OFDM) the source and destination addresses are located in the same OFDM frame and on the same OFDM subcarriers. Additional examples of repetitive signals are the preamble and sync signals which are constant in multiple packets.

In conditions of high SNR the data packets are detectable in the signal, thus the time of arrival of each data packet is known. Based on the respective times of arrival of the received data packets and due to the high SNR of the received signal, the contents of the data packet (e.g. control information and data payload) may be determined, and compared between multiple data packets to identify repetitive information in multiple data packets. However this is not possible in cases of low SNR in which the times of arrival of the data packet receptions are unknown and/or it is impossible to determine the contents of the data packet.

SUMMARY OF THE INVENTION

It is an object of the present invention to provide an apparatus, a system, a computer program product, and a method for detecting information which repeats in multiple data packets carried by a data communication signal.

When data communication signals are received under poor SNR conditions it may be impossible to detect the data packets in the received signal. Furthermore, even if data packets may be detected, it may be impossible to extract the data from the data packet.

Embodiments of the invention combine samples of a data communication signal (denoted herein signal samples or samples) into one or more united signals, in a manner which enhances the SNR of information which repeats in multiple data packets (denoted herein repetitive information). With better SNR, the contents of control fields and/or data payload which repeat in multiple packets may be detected even under poor channel conditions.

The signal samples are grouped into sequences (denoted herein sample sequences). For example, the data signals may be grouped so that each signal sequence is expected to include a single data packet (when the sampling and grouping are properly synchronized to the actual data packet reception times). The samples are combined into one or more united signals in a manner which improves the SNR of information which repeats in multiple data packets. In some embodiments the data sample values are combined directly. In other embodiments data packets are detected in the samples and the united signal(s) are created after data packet detection.

The united signal(s) are analyzed to detect if repetitive information is or is not present in the collected packets and/or to extract the repetitive information from the united signal.

Some embodiments of the invention are particularly beneficial when there is limited information about the transmitted signal (e.g. cycle, coding and modulation scheme, etc.). The sampled data packets are combined in different ways to form multiple united signals which are analyzed (either separately or in combination) in order to determine whether repetitive information is present in at least one of them. Thus different hypotheses regarding carrier frequencies, frequency hopping cycles, data packet reception times, and so forth may be analyzed until an effective combination of samples is achieved.

According to a first aspect of some embodiments of the present invention there is provided an apparatus for detecting repetitive information in data packets communicated between a first node and a second node over a wireless network. The apparatus includes processing circuitry, configured to:
   collect samples of a data communication signal transmitted between the first node and the second node over the wireless network at multiple respective times;
   group the collected samples into multiple sequences of samples;
   combine the sequences of samples into at least one united signal; and
   based on an analysis of the at least one united signal, provide a signal indicative of repetitive information in multiple data packets carried by the data communication signal.

According to some implementations of the first aspect of the invention, the apparatus further includes a sampler configured for sampling a baseband input signal and for providing the samples to the processing circuitry for collection.

According to a second aspect of some embodiments of the present invention there is provided a method of detecting repetitive information in data packets communicated between a first node and a second node over a wireless network. The method includes:
   collecting samples of a data communication signal transmitted between the first node and the second node over the wireless network at multiple respective times;
   grouping the collected samples into multiple sequences of samples;

combining the sequences of samples into at least one united signal; and based on an analysis of the at least one united signal, providing a signal indicative of repetitive information in multiple data packets carried by the data communication signal.

According to some implementations of the first aspect or second aspect of the invention, the analysis includes identifying a presence or absence of repetitive information in the at least one united signal, and the signal indicative of repetitive information includes an indicator of the identified presence or absence of repetitive information in multiple data packets.

According to some implementations of the first aspect or second aspect of the invention, the analysis includes extracting repetitive information from the at least one united signal, and the signal indicative of repetitive information includes the extracted repetitive information.

According to some implementations of the first aspect or second aspect of the invention, each of the sequences of samples is a single data packet.

According to some implementations of the first aspect or second aspect of the invention, the data communication signal between the first node and the second node is monitored.

According to some implementations of the first aspect or second aspect of the invention, a baseband input signal is sampled and the samples are provided for collection.

According to some implementations of the first aspect or second aspect of the invention, frequency conversion is applied to each one of the sequences of samples prior to combining the sequences of samples into the at least one united signal.

According to some implementations of the first aspect or second aspect of the invention, for at least one of said united signals the sequences of samples are combined by forming a weighted linear combination of sequences of samples and delayed versions of the sequences of samples.

According to some implementations of the first aspect or second aspect of the invention, weighting coefficients are selected for the weighted linear combination in accordance with the conditions of the communication channel of the network.

According to some implementations of the first aspect or second aspect of the invention, the sequences of samples are combined by specifying multiple sets of weighting coefficients and forming a respective united signal as a weighted linear combination of the sequences of samples and delayed versions of the plurality of the sequences of samples for each one of the sets of weighting coefficients. The signal indicative of repetitive information is provided when repetitive information is identified in at least one of the respective united signals.

According to some implementations of the first aspect or second aspect of the invention, for at least one of said united signals the sequences of samples are combined by:
  detecting a respective data packet for each one of the sequences of samples;
  using at least one of a preamble and a synchronization sequence of the data packets, calculating weights for combining the sequences of samples into a united signal; and
  forming a weighted linear combination of the sequences of samples and delayed versions of the sequences of samples using the calculated weights.

According to some implementations of the first aspect or second aspect of the invention, the sequences of samples are combined by:
  detecting a respective data packet for each one of the sequences of samples;
  performing symbol detection on the detected data packets to obtain respective symbol sequences; and
  linearly combining the symbol sequences.

According to some implementations of the first aspect or second aspect of the invention, the sequences of samples are combined by:
  detecting a respective data packet for each one of the sequences of samples;
  decoding each of the detected data packets into respective bit sequences; and
  for each position in the united signal, selecting a bit level occurring in a majority of bits at the position in the respective bit sequences.

According to some implementations of the first aspect or second aspect of the invention, for at least one of said united signals the sequences of samples are combined by:
  detecting a respective data packet for each one of the sequences of samples; and
  for each position in the united signal, selecting a bit level having a highest probability of occurrence at the position based on a likelihood-ratio analysis of the detected data packets.

According to some implementations of the first aspect or second aspect of the invention, respective sets of sequences of samples of the data communication signal are collected for each phase of a constant cycle of frequencies. At least one united signal is formed for each of the sets of sequences of samples. The signal indicative of repetitive information is provided when repetitive information is detected in at least one of the respective united signals.

According to some implementations of the first aspect or second aspect of the invention, respective sets of sequences of samples of the data communication signal are collected for each phase of multiple cycles of frequencies. At least one united signal is formed for each of the sets of sequences of samples. The signal indicative of repetitive information is provided when repetitive information is detected in at least one of the respective united signals.

According to some implementations of the first aspect or second aspect of the invention, the sample collection is synchronized to a detected data packet received from one of the first node and the second node.

According to some implementations of the first aspect or second aspect of the invention, the sample collection is synchronized to a detected request packet.

According to some implementations of the first aspect or second aspect of the invention, the sample collection is synchronized to a detected response packet.

According to some implementations of the first aspect or second aspect of the invention, the sample collection is synchronized to a cycle time of multiple detected data packets transmitted by at least one of the first node and the second node.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit.

As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the Drawings.

DETAILED DESCRIPTION

Figure 1:
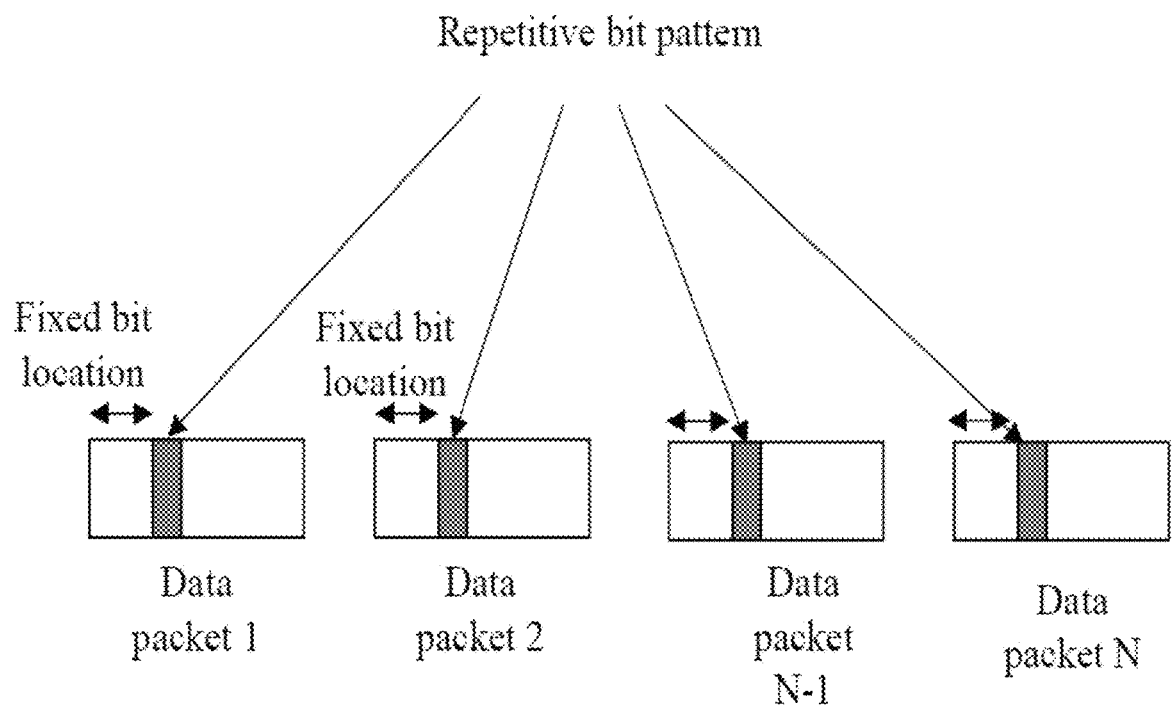
FIG. 1 illustrates a sequence of data packets with repetitive information.

The present invention, in some embodiments thereof, relates to detecting repetitive information in a data signal and, more specifically, but not exclusively, to detecting repetitive information in data packets.

Embodiments of the invention relate to processing samples of a communication signal so that the SNR of bit or symbol sequences that repeat in multiple data packets (i.e. data packets with repetitive information) is increased, making it possible to detect the presence of a particular repeating bit or symbol sequence and/or extract repetitive information from the data packets. As described in more detail below, samples of a data communication signal are collected and one or more united signals are created from samples of multiple data packets carried by the sampled communication signal. The united signals are analyzed to detect whether repetitive information (such as a specified data sequence) is present in the data packets.

In some cases, the goal is to determine whether a known data sequence (e.g. a packet preamble) is present in multiple data packets even without the ability to actually detect the data packet (e.g. as a result of a large distance between the reception side and the transmission side or due to high interferences on the reception side). For example, the user may wish to know if a response packet is present at a specific frequency or know the addresses of the source and destination. While it may be impossible to detect a specific data sequence in a single sampled data packet, it may be possible to detect it when the samples from multiple data packets are combined appropriately.

In other cases it is desired to determine whether an unspecified data sequence repeats in multiple data packets. For example, in many communication protocols source and destination addresses are present in every packet. Thus for data communication between the same source and the same destination, the source address and the destination address are commonly located in the same bit locations within the packet. When the rate and coding modulation scheme are kept constant, the symbols of the address are even kept in the same location within the packet signal. (In OFDM, for example, they are located in the same OFDM frame and in the same OFDM subcarriers and contain the same value.) If the SNR is too low, it is not possible to extract the source and destination addresses from samples of a single data packet. However by combining samples of several data packets into a united signal, the SNR of the repeating source and destination addresses may be increased enough that the contents of the fields may be extracted.

The repetition may be identified at various levels of the signal processing (e.g. before or after detection of the data packets in the samples of the data communication signal). When the data communication signal samples are combined into united signal(s) after data packet detection (e.g. at the data symbol or bit level), some initial processing may be performed on the samples in order to detect the data packets.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

1) Repetitive Information Detector

Figure 2A:
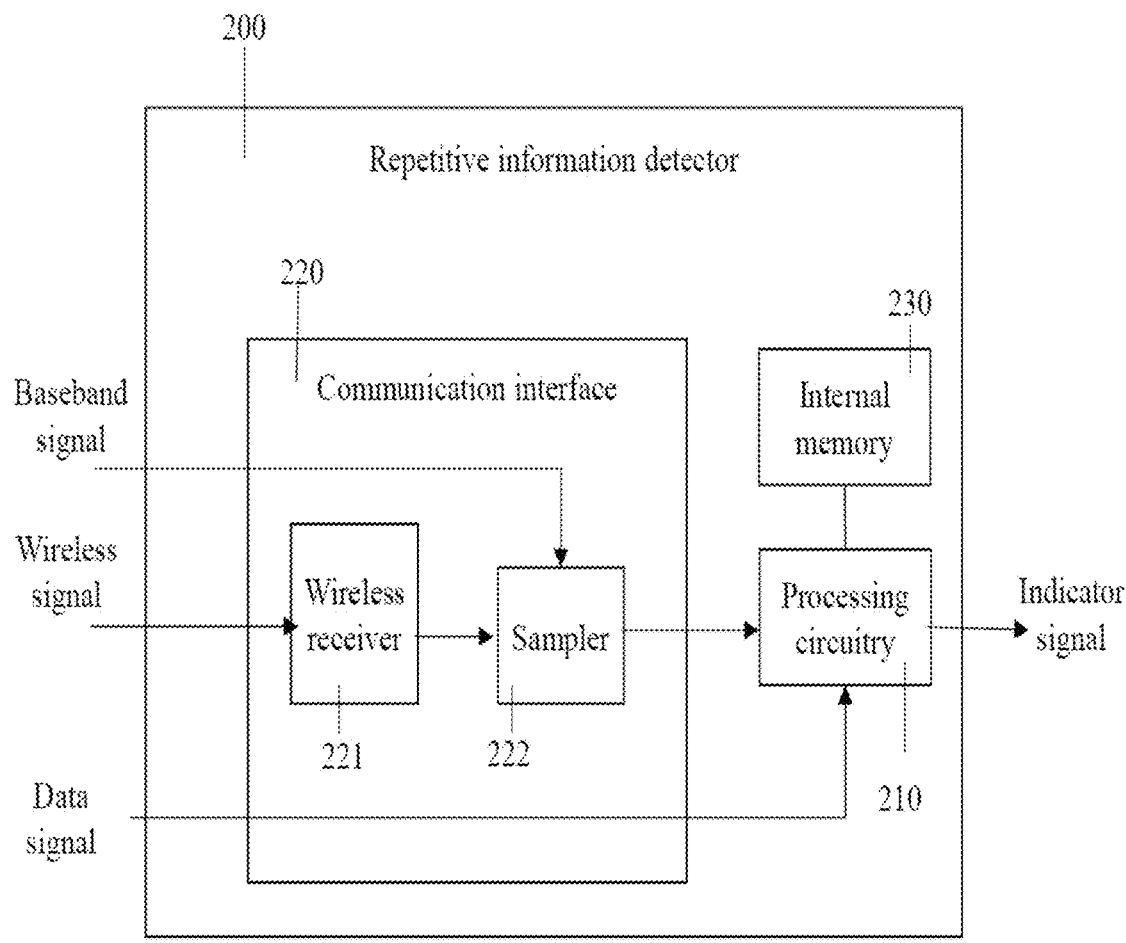
FIG. 2A is a simplified block diagram of an apparatus for detecting repetitive information in data packets communicated over a network, according to embodiments of the invention.

Reference is now made to FIG. 2A, which is a simplified block diagram of an apparatus for detecting repetitive information in data packets communicated over a network, according to embodiments of the invention. The apparatus (denoted herein repetitive information detector 200) includes processing circuitry 210 and optionally communication interface 220.

Processing circuitry 210 collects multiple samples of wireless communication signal transmissions between nodes of a wireless communication network at respective times. The samples are grouped into multiple sequences of samples (denoted sample sequences) and the sample sequences are combined into one or more united signals. The united signal(s) are analyzed and a signal indicative of repetitive information in the data packets (denoted herein an indicator signal) is provided based on the analysis.

Repetitive information detector 200 is not a node (or part of a node) in the wireless communication network and does not participate in the wireless communication between the nodes.

Optionally, repetitive information detector 200 monitors the wireless communication between the two nodes. The monitoring may be performed on transmissions of only one of the nodes, for example when the signal strength of transmissions received from the other node is not high enough. This monitoring may be used to obtain information to be used at a later stage in the repetitive information detection process. For example, monitoring the wireless communication between the nodes may assist in estimating the packet transmission timing and frequencies used by the nodes.

Figure 2B:
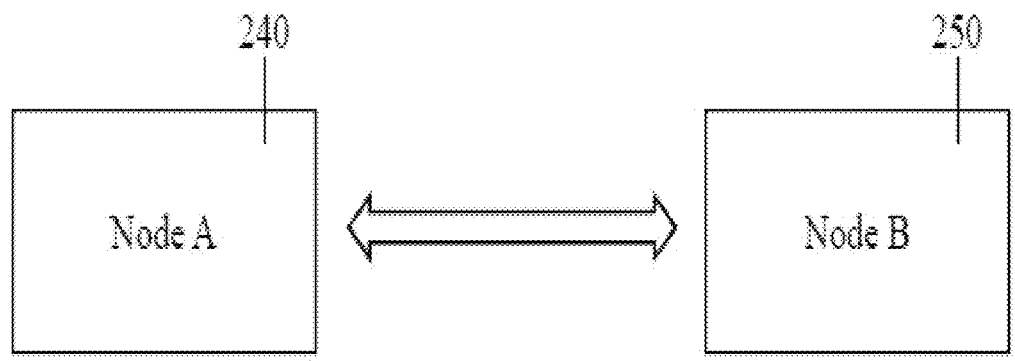
FIG. 2B is a simplified block diagram of a repetitive information detector monitoring communications between two nodes, according to an exemplary embodiment of the invention.
Figure 2B:
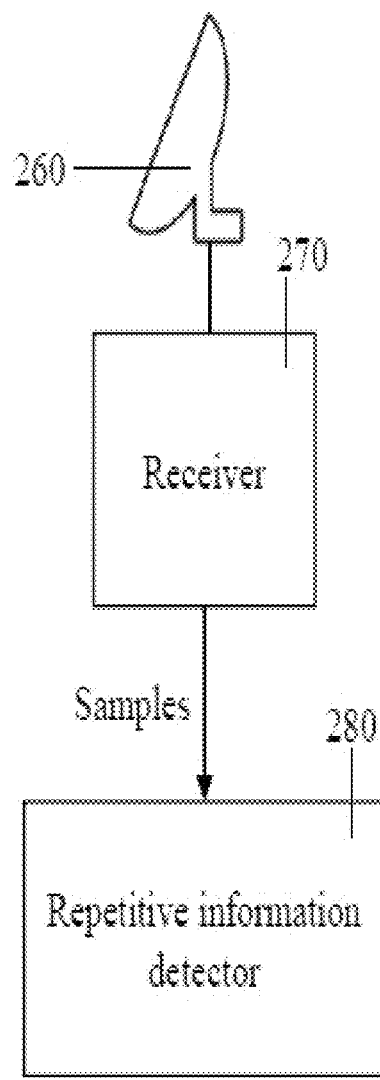

Reference is now made FIG. 2B which is a simplified diagram of a repetitive information detector monitoring communications between two nodes, according to an exemplary embodiment of the invention. Node A 240 and Node B 250 perform data communication over a wireless network.

The wireless communication between Node A 240 and Node B 250 is received by antenna 260 and processed by receiver 270. In the embodiment of FIG. 2B, the sampling is performed by receiver 270, which provides the samples to repetitive information detector 260. In other exemplary embodiments, repetitive information detector 260 includes signal processing capabilities. In this case receiver 280 may provide an unsampled signal (e.g., an analog baseband signal) to repetitive information detector 260, which then performs downconversion and sampling before combining the sample sequences into united signal(s) and analyzing the united signal(s) to detect repetitive information.

Types of analysis that may be performed on the united signal(s) include but are not limited to:
  i) Signal presence detection;
  ii) Preamble detection;
  iii) Synchronization;
  iv) Frequency correction;
  v) Equalization; and
  vi) Constellation bit extraction.

Optional embodiments for combining sample sequences into a united signal include but are not limited to:
  a) Forming a weighted linear combination of multiple sequences of the signal samples, where there is a delay between the multiple sequences as shown in Equation 1 below;
  b) Detecting data packets in the signal samples and using a data packet preamble and/or a synchronization sequence to combine the detected data packets;
  c) Detecting data packets in the signal samples, performing symbol detection on the detected data packets and linearly combining the data symbols.
  d) Detecting data packets in the signal samples, decoding each of the sampled data packets into bits, and for each position in the united signal selecting a bit level occurring in a majority of bits at that position in the data packet.
  e) Detecting data packets in the signal samples and selecting the bit level having the highest probability of occurrence at each position in the data packet. These probabilities may be calculated, for example, by performing a likelihood-ratio analysis of the detected data packet and/or calculating the probability in another manner (e.g. by linear combinations of bit probabilities at a given position in multiple data packets).

Optionally, the samples contained in each sample sequence are expected to correspond to a single data packet.

Optionally, grouping the signal samples into sample sequences is synchronized to one or more of:
  a) Transmissions received from a different source (i.e. not from the node receiving the data packets which are being analyzed for repetitive information);
  b) The cycle time of some detected data packets; and
  c) Known parameters of the communication signal (e.g. cycle time and frequency hopping pattern).

Exemplary embodiments for establishing the timing for grouping the signal samples are described in Section V below.

Referring again to FIG. 2A, repetitive information detector 200 optionally includes communication interface 220. Different embodiments of communication interface 220 may input signals at one or more stages of signal reception (e.g. RF, baseband, digitized after analog to digital conversion, etc.).

Non-limiting examples of signals which may be input by communication interface 220 include but are not limited to:
  1) Wireless signal—communication interface 220 optionally includes wireless receiver 221 (e.g. an RF receiver) which receives a wireless signal carrying the data packets and may also perform signal processing, such as downconverting and sampling the received communication signal;
  2) Data signal after downconversion—communication interface 220 optionally includes sampler 222 which inputs and samples analog baseband signals. Sampler 222 may also perform analog to digital (A/D) conversion on the baseband signal samples; and
  3) Digital signal—optionally communication interface 220 inputs the sample values in a digitized format after the received communication signal has been sampled and undergone A/D conversion.

Optional embodiments for ensuring that the data packet is sampled at the correct time stamps are described in Section V below.

As used herein the term "data sequence" means a sequence of symbols or bits within a data packet. It is noted that the term "data sequence" is not limited to the data payload in the data packet but may include the contents of other portions of the data packet.

As used herein the term "repetitive information" means a data sequence that is present in multiple data packets.

As used herein the term "detect repetitive information" means that it is determined whether a specified or unspecified data sequence repeats in multiple data packets.

As used herein the terms "samples of a communication signal", "signal samples" and "samples" means the respective levels of the communication signal (before or after downconversion) at multiple sampling times.

As used herein the terms "sequence of samples" and "sample sequence" means a sequence of consecutive samples of a communication signal.

As used herein the term "collecting samples" means storing or buffering a series of samples of a communication signal so that they may later be combined into one or more united signals.

As used herein the terms "combining sequences of samples" and "sample sequences are combined" means that an operation (e.g. mathematical, logical, numerical, etc.) is performed on the sample sequences resulting in a single signal. Combining signals optionally includes detection of data packets in the sequences and performing operations on detected data packets.

As used herein the term "united signal" means the result of the combination of multiple sample sequences.

As used herein the term "time stamp" means the time at which the communication signal is sampled. Each sample has a respective time stamp. For a given packet, the time stamp of the first sample of the packet indicates the time at which sample collection for that packet should begin.

Optionally, the analysis includes detecting whether repetitive information is present or absent in one or more of the united signal(s) and the indicator signal indicates whether repetitive information is present or absent in the data packets. Further optionally, the analysis includes identifying whether a specified signal is present or absent in one or more of the united signal(s). In some cases, an indicator signal may be provided only when the presence of repetitive information is identified.

Alternately or additionally, the analysis includes extracting repetitive information from one or more of the united signal(s) and the indicator signal includes the extracted repetitive information. Further optionally, an indicator signal is not provided unless repetitive information is extracted from one or more united signal(s).

Optionally the repetitive information includes one or more of:
a) A packet preamble (also denoted herein a preamble signal);
b) A packet synchronization sequence (also denoted herein a sync signal);
c) A source address;
d) A destination address; and
e) A sequence of data bits and/or data symbols.

Optionally, the sampled data packets are combined into a single united signal and the analysis is performed on the single united signal. This approach minimizes the amount of processing and analysis required in order to provide the indicator signal and may be beneficial in cases where the parameters of data packet transmission are known.

Alternately, the sampled data packets are combined into multiple united signals and the analysis is performed on the multiple united signals. Each united signal is effectively a hypothesis of how the signals should be combined. The analysis tests the various hypotheses to determine if repetitive information may be detected and/or extracted from one or more of the united signals. This approach is beneficial in cases where parameters of data packet transmission are unknown (e.g. in frequency hopping signals where the carrier frequency cycle is unknown).

Exemplary embodiments of detecting the presence of a specified data sequence (e.g. a sync and/or preamble sequence) in repeating in multiple data packets under different frequency hopping schemes are described in Sections 3.2-3.3 below. Exemplary embodiments of detecting if an unspecified data sequence repeats in multiple data packets under different coding and modulation transmission schemes are described in Sections 4.1-4.3 below.

Optionally, repetitive information detector 200 includes internal memory 230 which may be used to store the signal samples. The stored samples are thus easily accessible to processing circuitry 210 for analysis.

Optionally, the processing circuitry performs additional signal processing on the extracted repetitive information (e.g. demodulates the extracted repetitive information into data symbols or data bits).

2) Method of Detecting Repetitive Information in Data Packets

Figure 3:
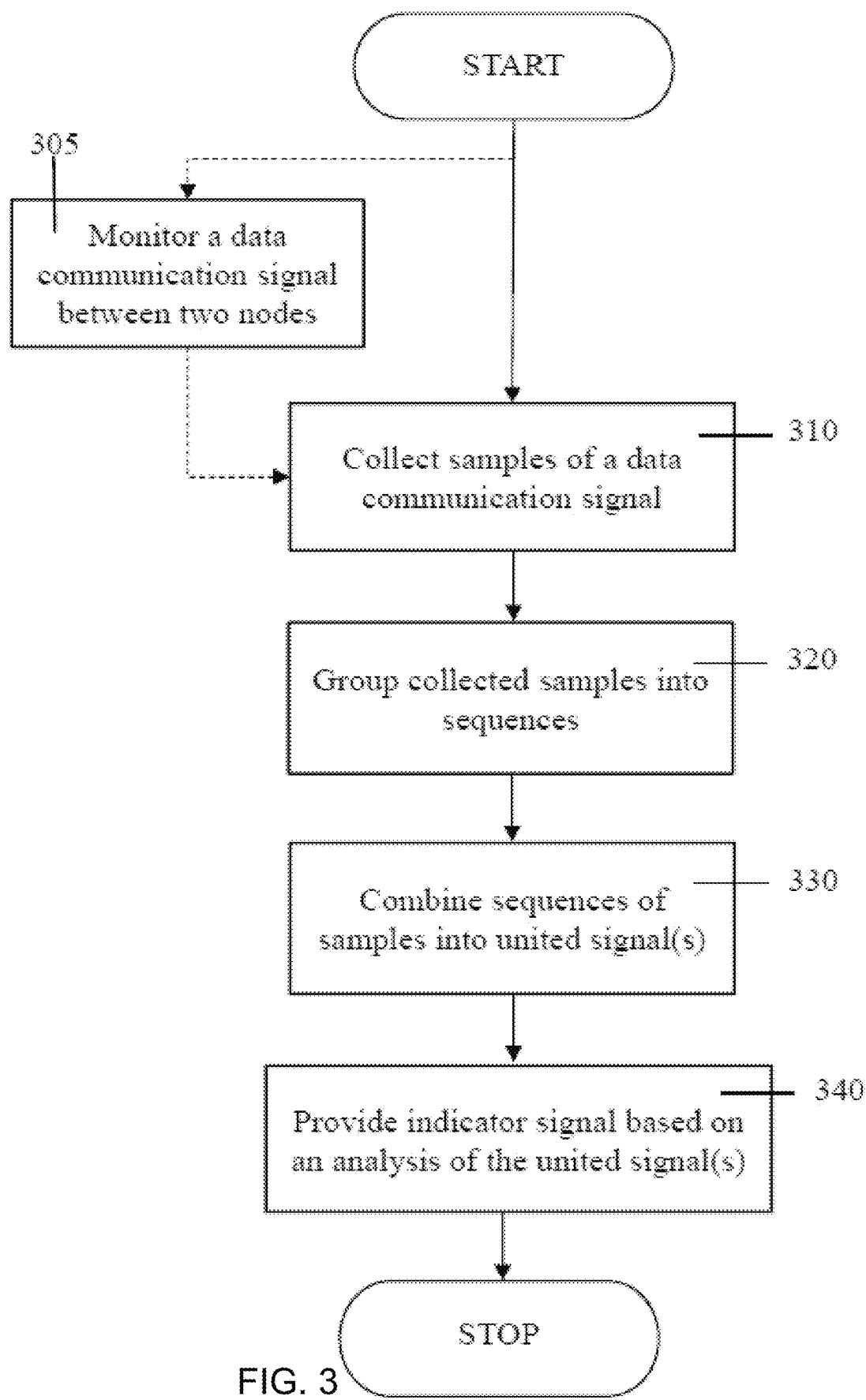
FIG. 3 is a simplified flowchart of a method of detecting repetitive information in data packets communicated over a network, according to embodiments of the invention.

Reference is now made to FIG. 3, which is a simplified flowchart of a method of detecting repetitive information in data packets communicated over a network, according to embodiments of the invention.

In 310, samples of a communication signal transmitted between two nodes are collected at different respective times. Optionally 310 includes sampling the communication signal after downconversion. Alternately, the data signal sample values may be input via a digital communication interface. The device performing sample collection is not a participant in the communication between the two nodes.

Optionally, in 305, the data communication signal between two nodes is monitored, for example in order to determine whether samples of the communication signal should be collected and/or the timing of the sample collection.

In 320, the samples are grouped into sample sequences. Optionally, the length of each sample sequence is selected so that each sample sequence includes samples of a single data packet, if the start of each sample sequence correctly aligns with the first sample of a data packet.

In 330, multiple sample sequences are combined into one or more united signals. Optionally, the sample sequences are combined by an operation on the signal sample values themselves (e.g. by weighted linear combination as described in Section 4.1). Alternately, data packets are detected in the sample sequences and the combination is performed at the data packet, symbol or bit level (as described in Section 5).

In 340, the united signal or signals are analyzed and an indicator signal is provided when the result of the analysis indicates that repetitive information is present in multiple data packets. Optionally, the indicator signal is provided only when repetitive information is identified in and/or extracted from one or more of the united signal(s).

In some cases the communication network may use frequency hopping transmission (with or without a known cycle). In order to collect samples of the signal carrying the data packets, the communication signal is downconverted from the current frequency, before the samples are collected and/or combined (e.g. see FIG. 4). When the current carrier frequency is unknown, samples may be collected for communication signals at multiple carrier frequencies. Several united signals may be formed from the samples collected at the various frequencies and analyzed to determine whether repetitive information is detected in one or more of them.

In a first exemplary embodiment, the frequency hopping signal is transmitted over a constant cycle of frequencies. A respective set of sample sequences is collected for each phase in the cycle. One or more united signal(s) are formed for each of the sets. The indicator signal is provided when repetitive information is detected in at least one of the united signal(s).

In a second exemplary embodiment, the frequency hopping signal is transmitted over constant cycle of frequencies but the cycle itself is unknown. Respective sets of sample sequences are collected for each phase of multiple cycles of transmission frequencies, where each of the cycles is an estimate of a possible cycle of frequencies being used for transmission. One or more united signal(s) are formed for each of the sets. The indicator signal is provided when repetitive information is detected in at least one of the united signal(s).

Figure 4:
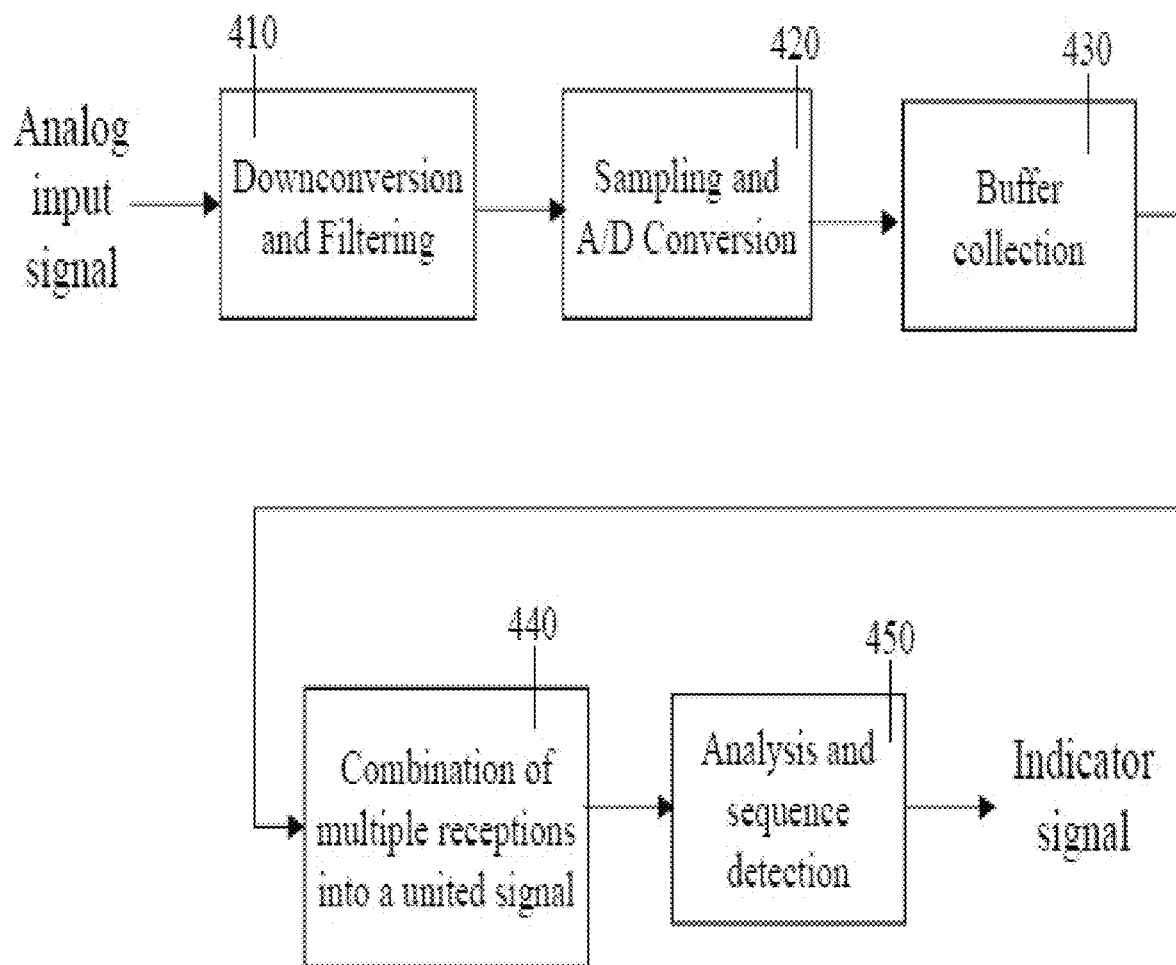
FIG. 4 is a simplified diagram illustrating the processing of a data communication signal according to an exemplary embodiment of the invention.

Reference is now made to FIG. 4, which is a simplified diagram illustrating the processing of a data communication signal according to an exemplary embodiment of the invention. In the present example, the indicator signal indicates whether a specified data sequence has been detected in the united signal. Assuming that the SNR was too low to detect the data sequence in a single data packet, this means that the specified data sequence repeated in multiple data packets.

In 410, the analog signal modulated with the data packets is downconverted and filtered.

In 420, the downconverted signal is sampled and the analog-to-digital (A/D) conversion is performed on the samples. Exemplary embodiments of aligning the sampling times to the arrival times of the data packets is described in Section 5 below.

In 430, the signal samples are collected in a buffer.

In 440, the buffered samples are combined into one or more united signals.

In 450, the united signal(s) are analyzed and an indicator signal is provided when the specified data sequence is detected in at least one of the united signal(s).

In some exemplary embodiments, repetitive information detector performs all of the processing stages shown in FIG. 4. In alternate embodiments, some or all of, downconversion and filtering (410), sampling and A/D conversion (420) and buffer collection (430) may be performed externally. During 440, the repetitive information detector retrieves the stored signal samples and combines them into the united signal(s).

3) Combining Sample Sequences into a United Signal

The manner of combining the samples into a united signal may depend on the quality of the received communication signal. Embodiments for combining sampled data packets into a united signal are now described.

In a first optional embodiment, which may be performed before data packet detection (e.g. when SNR is too low to detect data packets in the communication signal) the samples are combined into a united signal by weighted linear combination of sequences of samples, as described in more below.

Alternate optional embodiments may be performed after data packet detection, when the quality of the received signal is adequate for detecting data packets from the signal samples but the SNR is not high enough to extract the repetitive information from the identified data packets. Exemplary embodiments include but are not limited to:

a) Uniting the sampled data packets into a single data packet by performing a linear combination of delayed versions of the signal samples, optionally using the preamble and/or synchronization sequence of the data packets and/or parts of the payload itself.

b) Performing symbol detection on the sampled data packets to obtain respective symbol sequences and linearly combining the symbol sequences.

For example, symbols may be achieved (before or after equalization, but before de-mapping or any other symbol to bits method) or LLRs (log-likelihood-ratios) from each packet and be averaged coherently before de-mapping into bits (or any other method to extract bits from symbols, such as MLSE decoding).

c) Decoding each of the sampled data packets into a respective bit sequence and, for each position in the united signal selecting a bit level occurring in a majority of bits at that position in the bit sequences.

d) Selecting the bit level having the highest probability of occurrence at each position in the data packet.

As used herein the term "delayed versions of the signal samples" means the samples of multiple data packets (packets 0 to K−1) with delay m, given as $x_k[n-m]$ in Equation 1 below.

3.1) Weighted Linear Combination

Optionally, the sampled data packets are combined into a united signal as a weighted linear combination of sequences of samples of the communication signal where the sequences have differing delays, as shown in Equation 1 below. The expected times of arrival of the data packets are known but it is unknown whether the data sequence(s) are actually present in the data packets. When the data sequence repeats in the sampled data packets, combining the samples by linear combination improves the SNR of the repeating data sequence so that it may be more easily detected by a detection mechanism (e.g. cross correlation with a reference series).

Using a weighted linear combination to form a united signal is particularly beneficial in cases where it is desired to detect the presence of a fixed data sequence (e.g. packet preamble) or a fixed variant of a set of possible data sequences (e.g. packet sync sequence). Note than the united signal may still have residual impairments, such as channel response and frequency offset.

The data packet samples may be combined by performing a weighted linear combination in accordance with Equation 1:

$$x_{united}[n]=\Sigma_{k=0}^{K-1}\Sigma_{m=0}^{M-1}h_{k,m} \cdot x_k[n-m] \quad (1)$$

where $h_{k,m}$ is a set of weighting coefficients and $x_k[n-m]$ are the samples of multiple data packets (packets 0 to K−1) with delay m. For each data packet k, $h_{k,m}$ may be seen as an equalizer.

Optionally, the $h_{k,m}$ weighting coefficients are selected in accordance with conditions of the communication channel, for example by channel estimation, MRC (maximum ratio combining) and/or other channel equalization methods. Channel estimation may be performed by cross correlation of the input signals with a reference signal (if one is known) or by cross correlation of the input signals with one another.

Optionally, multiple united signals are formed for the same samples using different (typically predefined) weighting sets. An analysis is performed on each of the united signals. An indicator signal is provided when the presence of repetitive information is identified in and/or extracted from at least one of the united signals.

Figure 5:
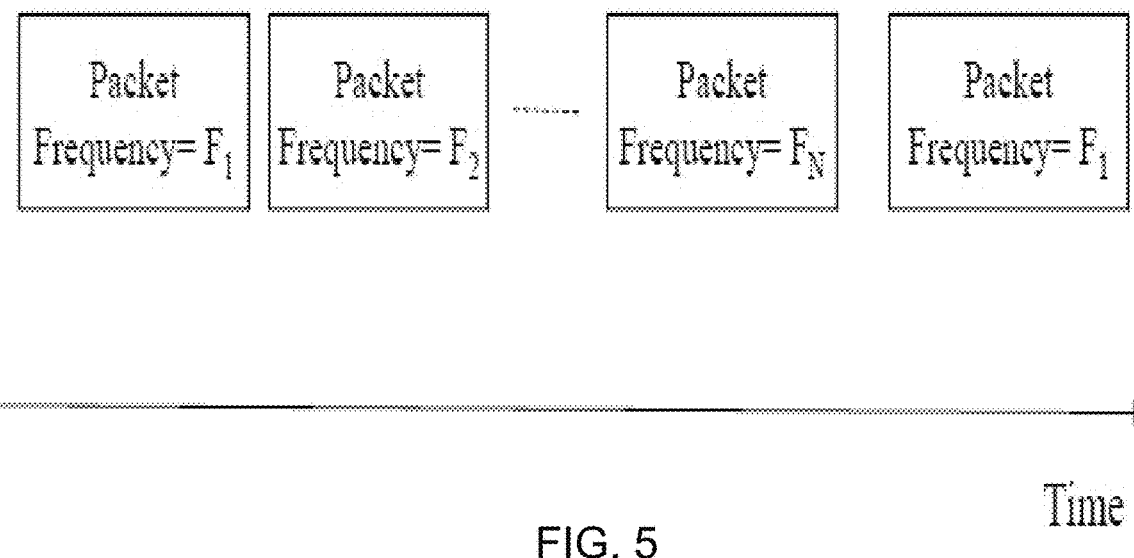
FIG. 5 illustrates a frequency hopping transmission with a cycle of length N.

An exemplary embodiment of detecting a specified data sequence using multiple predefined weighting sets is described by the following pseudo code:

Select K sample sequences
Loop over sets of $h_{k,m}$ :
  Unite the K signals using Equation 1
  Attempt detection of the specified data sequence in the united signal
  Stop upon successful detection and indicate detection was found 3.2) Detection of a Known Data Sequence in Frequency Hopping Transmission with a Constant Known Cycle Optionally, the weighted linear combination method is used to determine the presence or absence of a known data sequence or a fixed variant of possible data sequences (e.g.

sync and/or preamble sequences) in frequency hopping transmissions with constant known cycle. In this type of transmission, a packet is transmitted at known time intervals and at different frequencies. The frequency sequence repeats after N packets have been transmitted (as illustrated by FIG. 5).

The processing circuitry collects samples at multiple known frequencies according to a constant cycle.

In a first exemplary embodiment, a single united signal is formed for each for each phase of the frequency cycle (where the term phase means a time within the N sequence of carrier frequencies). In other words, if the frequency cycle repeats every N data packets, N united signals are formed. The united signals combines the samples at respective potential phases of the frequency hopping signal. Each of united signals is analyzed to detect if the known data sequence (or variant) is present, for example by cross correlation of each of the united signals with the data sequence being sought. If one of the phases includes multiple instantiations of the known data sequence (or variant), detection will occur at that phase. An indicator signal is provided when the data sequence (or one of the variants of the sequence) is detected in at least one of the respective united signals.

In a second exemplary embodiment, multiple united signals are formed for each for each phase of the frequency cycle, each of the united signals being generated by a respective weighting set $h_{k,m}$. The data samples are combined for each $h_{k,m}$ set in turn at each of the possible phases. The procedure stops when repetitive information is found in the current united signal (i.e. with the current $h_k$,m and current phase d). In this case the procedure may be described by the following pseudocode:

```
Loop over starting phase (index of first packet) d = 0...(N−1):
    Select K sample sequences by their index: d, d + N, ... , (d + K − 1) · N
    Loop over sets of h_{k,m}:
        Unite the k signals using Equation 1
        Attempt detection of the specified data sequence in the united signal
        Stop upon successful detection and indicate detection is found at phase d
```

In a third exemplary embodiment, the detection of repetitive information also includes a quality figure of merit which describes the quality of the detection decision. The correct phase of the sampled data packets is decided based on the quality figure of merit. The procedure may be described by the following pseudocode:

```
Loop over starting phase (index of first packet) d = 0...(N−1):
    Select K sample sequences by their index: d, d + N, ... , (d + K − 1) · N
    Loop over sets of h_{k,m}:
        Unite the k signals using Equation 1
        Attempt detection of the specified data sequence in the united signal
        Upon successful detection collect a quality figure of merit
Select the phase with the best quality figure of merit
```

Examples of the quality figure of merit include but are not limited to: SNR, signal variance, correlation peak value.

In a fourth exemplary embodiment, the frequency cycle is constant but there are several possibilities of what this constant cycle might be, $\{N_0, N_1, \ldots, N_u\}$. In this case the selection of samples to combine is also looped over all the frequency cycle possibilities:

```
Loop over cycles N_i={N_0,N_1,...,N_u}:
    Loop over starting phase (index of first packet) d = 0...(N_i−1):
        Select K sample sequences by their index: d, d + N, ... , (d + K − 1) · N
        Loop over sets of h_{k,m}:
            Unite the k signals using Equation 1
            Attempt detection of the specified data sequence in the united signal
            Stop upon successful detection and indicate detection is found at phase d and in cycle N_i
```

3.3) Detection of Repetitive Information in Frequency Hopping Scenario, with Constant Unknown Cycle or with No Cycle In some cases the network communicates by frequency hopping over known frequencies. However the cycle may not be known or even constant. The approach utilized for the constant known cycle in Section 3.2 above may be adapted to these cases by gathering signals into potential sets which are formed using several hypotheses or by performing correlation between the signals.

Optionally, the processing circuitry collects respective sets of sampled data packets at the known frequencies for multiple cycle lengths (either constant cycle lengths or differing cycle lengths). At least one respective united signal is formed for each set of sampled data packets at the constant cycle or the different cycle lengths. Each of the united signals is analyzed. The indicator signal is provided when repetitive information is identified in and/or extracted from at least one of the respective united signals When the timing of the data packet capture and/or sampling is based on data packets received from another source (for examples see Sections 5.1 or 5.2 below), estimated cycle hypotheses may be made based on the time difference of every two received packets or by an integer denominator of two receptions. For example, if receptions are found at times 20 msec, 50 msec and 70 msec, potential cycles may be 2 msec, 5 msec and 10 msec.

4) Detection of Repetitive Information in Detected Data Packets

Optionally, data packets are detected in the sample sequences and the sample sequences are combined after data packet detection. Further optionally, each sample sequence is decoded into a respective data packet.

This approach is beneficial when the SNR is high enough to detect data packets in the communication signal but not high enough to extract the bits from the data packets.

Exemplary embodiments for combining the data packets detected in the signal samples include but are not limited to:

Embodiment A) Using a data packet preamble and/or a synchronization sequence;

Embodiment B) Obtaining respective symbol sequences by performing symbol detection on the sampled data packets and linearly combining the data symbol sequences;

Embodiment C) Decoding each of the sampled data packets into respective bit sequences and for each position in the united signal, selecting a bit level occurring in a majority of bits at the position in the respective bit sequences;

Embodiment D) Selecting the bit level having the highest probability of occurrence at each position in the data packet.

Note that the exemplary embodiment extracts the PHY layer bits (right before mapping stage), without going into further details of extracting information bits after de-interleaving, de-scrambling and decoding FEC (forward error correction). These stages may be performed separately. Because the bits are constant and pass through the same stages of interleaving, scrambling and FEC encoding, etc. there is a high probability that most of them will also be constant in the PHY layer level.

The repeating bits or symbols may contain information including but not limited to:
a) Source address;
b) Destination address;
c) Cell identifier; and
d) Any other information that is constant in multiple packets.

4.1) Detection of Co-Located Repetitive Data Bits when Rate and Coding Modulation are Constant The instant exemplary embodiment is directed at detecting repeating data bits or symbols which are located at the same location within detected data packets (i.e. at the same bit index from the packet start bit) when the rate and coding modulation are constant.

In order to unite the entire data packets (as in exemplary embodiment A above), the data packets should be transmitted by the transmitter at the same frequency. Optionally, in cases in which the data packets are not transmitted at the same frequency, the receiver performs frequency correction to convert all the data packets to the same baseband frequency to ensure that the data packets do not have a frequency offset between them. In alternate optional embodiments, if the detected data packets which are being combined share the same frequency then frequency offset correction before uniting may be skipped, because a frequency offset between the packets is not expected.

When uniting the detected data packets at the symbol level (as in exemplary embodiment B above), the packets may arrive at different frequencies (e.g. in frequency hopping scenarios). In addition, coherent averaging may be performed after adjusting the phase between the symbols and is required only if the symbols are before equalization. Weighted linear combination may be applied if the SNR is different between the averaged symbols.

4.2) Detection of Co-Located Repetitive Data Bits when Rate and Coding Modulation are not Constant When the rate or coding modulation are not constant, it is not possible to perform exemplary embodiments A-C on all the detected data packets directly.

Optionally, detected packets that share the same rate and coding modulation are selected and then are treated similarly to combining data packets with constant rate and coding modulation as described above in Section 4.1.

In cases in which only the rate changes but the coding is the same (e.g. with the same forward error correction but no puncturing), exemplary embodiments B and C may be used. Averaging per-bit metrics, such as LLR before de-mapping or any other method for bit extraction may be implemented. Also bit averaging may be performed after bit extraction. Weighted sum combination may be used, so that lower rate bits (with higher SNR, which is this case is bit energy to noise ratio) may receive higher weight the high rate bits.

In cases with the same forward error correction (FEC) but different puncturing, exemplary embodiment C may be used. The unpunctured bits (before or after mapping) are combined, improving their SNR while taking into consideration the punctured bits that should not be averaged. For example, if the bits without puncturing are X0,X1,X2,X3, and in another packet Y0,Y1,Y2<Y3, and after puncturing in another packet Z0,Z1,Z3 (rate 3/4), the bits may be averaged as: (X0+Y0+Z0)/3,(X1+Y1+Z1)/3,(X2+Y2)/2,(X3+Y3+Z3)/3.

4.3) Detection of Repetitive Data Bits, which are not Co-Located

Optionally, when the repetitive information is not located in the same location in the data packet but the coding scheme is the same (e.g. no puncturing), the position of the repetitive bits is found by correlation between the packets.

5) Aligning Sample Sequences with Data Packet Arrival Times

In order to combine the signal samples correctly into a united signal, the samples contained in the sample sequences must be aligned with the sampling times of the data packets.

Optionally, data packet sampling is synchronized to a data packet detected in the transmission between nodes participating in the wireless communication (e.g. from Node A or Node B in FIG. 2B). Further optionally, the data packet sampling is synchronized to at least one of:
a) Request packet(s) detected in the signal received from the different source; and
b) Response packet(s) detected in the signal received from the different source.

Figure 6:
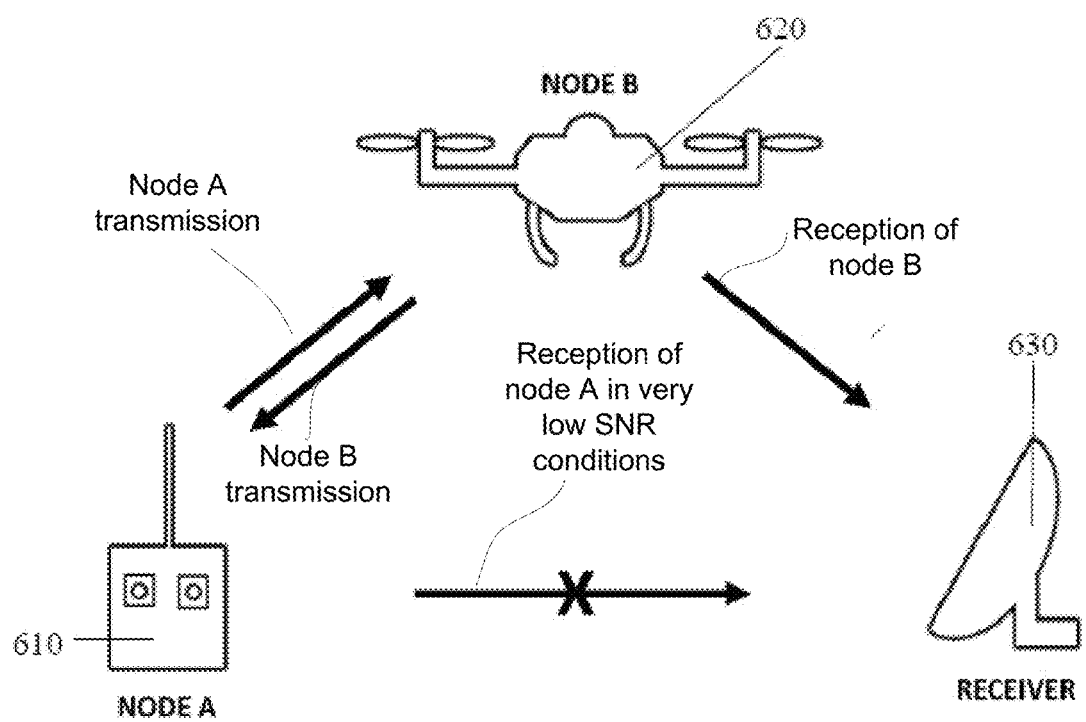
FIG. 6 is a simplified diagram of nodes communicating over a wireless data communication network.

To illustrate this approach, reference is now made to FIG. 6 which is a simplified diagram of nodes communicating over a wireless data communication network. In FIG. 6, Node A 610 and Node B communicate over a wireless network. It is desired to detect and/or extract repetitive information from signals transmitted by Node A. Receiver 630 receives transmissions from Node A 610 with very low SNR. However transmissions from Node B 620 are received by receiver 630 with good enough SNR to detect data packets in signals transmitted by Node B. Thus the grouping of signal samples into sample sequences may be synchronized to the timing of data packets detected in the received Node B signal.

Alternately or additionally, the time stamps for grouping samples into sample sequences are based on a cycle time of multiple detected data packets.

Following are exemplary embodiments for collecting the samples at the correct sampling times.

5.1) Sampling Based on Received Request or Response Packets

In a first exemplary embodiment, the timing of the data packet sampling is established based on a request or response packet received from a different source (e.g. Node B).

Node B may be transmitting response packets to Node A (e.g. acknowledge packets or clear-to-send packets). Node B may also be sending actual data to Node A, which returns response packets. Another possibility is that Node A and Node B have TDD communication and each side transmits in its own turn.

Optionally, when a transmission from a different source (e.g. Node B) is received with adequate SNR, the time stamps for collecting the required packets (e.g. from Node A) are set to a constant time interval before or after the start time or end time of the data packet(s) received from Node B. Response packets are typically sent after the end of the request packet, thus the time stamp for collecting the next data packet is a constant time interval after the end of the request packet received from the different source. Request packets are typically sent before the response packets, thus the time stamp for collecting the next data packet is a constant time interval before the expected start time of the next request packet from the different source.

5.2) Synchronization by Received Data Packets

In a second exemplary embodiment, it is assumed (or known) that there is a constant cycle time for data packet transmissions. Additionally, some of the data packets sent to Node A are detectable. The sampling time stamps may additionally be based on the transmission from another source (e.g. request and/or response packets received from a different source as in the Section 5.1 above).

Optionally, the cycle time for the data packet reception is estimated according to the detectable data packets. The cycle time may be found by searching for timings that support Equation 2 below or by any other integer linear optimization criteria that searches for a cycle T when the vector of some receptions $\{T_n\}$ is known.

$$\text{cycle time, initial phase} = \underset{T,T_0}{\operatorname{argmin}} \sum_{k=1}^{N} \left| T_i - T_0 - \operatorname{round}\left(\frac{T_i - T_0}{T}\right) \cdot T \right|^2 \quad (2)$$

When an estimated value of T exists (for example if the cycle time is known, except for clock errors), Equation 2 may be changed to Equation 3:

$$\text{cycle time, initial phase} = \underset{T,T_0}{\operatorname{argmin}} \sum_{k=1}^{N-1} \left| T_i - T_0 - \operatorname{round}\left(\frac{T_i - T_0}{T_{est}}\right) \cdot T \right|^2 \quad (3)$$

Once cycle time and initial phase are known, the required signal may be captured at the expected time stamps according to Equation 4:

sample collection time stamp(n)=(cycle time)·n+(initial phase)  (4)

5.3) Synchronization for Fixed Frequency or Frequency Hopping Transmission with a Known Cycle Time In this scenario, there is a constant cycle time of data packet transmission and the cycle time is known (or multiple possibilities of the cycle time are known). Additionally, the wireless signal transmission is at a known single frequency (or within a known list of frequencies) or in a fixed frequency hopping sequence. For the frequency hopping case, the frequency list is at least partially known and that there is a fixed cycle of frequencies that are transmitted (i.e. F1, F2, . . . FN, F1, F2, . . . FN . . . ).

Data packet sampling is performed at known time stamps every cycle. Several overlapping captures may also be performed.

For example, a signal with a known cycle of 10 msec is transmitted with a known frequency hop cycle of four known frequencies {F1, F2, F3, F4}. A typical packet length is expected to be 1 msec. Thus every 10 msec a 1 msec signal is expected, and every 40 msec a signal is expected at the same frequency.

A frequency, Fk, is selected from the list and the received signal is filtered for Fk only. Groups of signals that are greater than 1 msec long are collected, say 2 msec. Signals are added to the same group when their start times are integer multiples of 40 msec from one another. Thus group 1 contains signals starting at times: 0, 40, 80, 120, . . . Group 2 contains 2 msec signals starting at times: 1, 41, 81, 121, . . . (note the overlapping of 1 msec). Group 3 contains 2 msec signals starting at times: 2, 42, 82, 122, . . . . The signals are collected in this manner until the final group which contains 2 msec signals starting at times: 39, 79, 119, 159, . . . .

For each one of the groups, approaches similar to those described above may be adapted to determine if a signal is present in this group of signals. For example, many linear combinations of the signals within the group may be made and then the result may be passed through a detection mechanism.

If the correct packet cycle or hop cycle is not known but there are several possibilities for the hop cycle, each possible hop cycle may tested until a signal is found.

5.4) Synchronization by Known Cycle Time Possibilities for a Dynamic Frequency Hopping Pattern In this scenario, there is a constant cycle time of the transmission and the cycle time is known (or multiple possibilities of the cycle time are known). The frequency hopping pattern is dynamic (i.e. the order of the frequencies transmitted in each cycle may change and/or not all frequencies must be transmitted in every cycle).

In this case, every two captures above may be correlated and the two signals will be associated with the same group only if there is a high enough correlation between them.

Correlation between two signals may be calculated as Equation 5:

$$\operatorname{corr}(i, j) = \max_{N_0} \left\{ \left| \sum_{n=N_0}^{N_0+N-1} x_i[n] \cdot x_j^*[n] \right| \right\} \quad (5)$$

If corr(i,j)>threshold, the two signals i and j belong to the same group.

When the transmission uses a fixed rate and coding modulation scheme, packets may be correlated either before symbol extraction (i.e. the raw signal), after symbol extraction before bit metric creation (such as log likelihood ratio per bit or per bit group) or after bit metric creation (and before FEC decoding if it exists). Frequency offset and channel response may be expected to remain nearly constant and only phase is expected to change (e.g. sampling phase, local oscillator phase). In case of multiple-in multiple-out (MIMO) transmission, multiple channels are expected to change similarly (e.g. the phase changes in the same way) and other transmission parameters may be expected to remain constant (e.g. frequency offset and/or channel response).

In summary, the embodiments presented herein provide a solution for the technical problem of detecting and/or extracting data from received data packets under conditions of low SNR which otherwise would make such detection and/or extraction impossible. Samples of the communication signal samples are processed as described above so that the SNR of information (e.g. a sequence of symbols) which repeats in multiple data packets is increased to a level which enables detecting and/or extracting the repetitive information. Multiple approaches for aligning the signal sequences with data packet receptions are also presented. Proper alignment improves the effectiveness of combining multiple sample sequences into united signal(s), resulting in even greater improvement of the SNR of the repetitive information.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant data packet formats, communication signal transmission schemes, frequency hopping transmissions, rate and/or coding of transmitted data, signal sampling, techniques for combining sequences, correlation techniques, data packet detection techniques and techniques for extraction of data symbols and/or bits from detected data packets will be developed and the scope of the terms data packet, communication signal, frequency hopping, rate, coding, sampling communication signals, combining sequences, correlation, detection of data packets and extraction are intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of detecting repetitive information in data packets communicated between a first node and a second node over a wireless network, comprising:
   collecting samples of a data communication signal transmitted between said first node and said second node over said wireless network at a plurality of respective times;
   grouping said collected samples into a plurality of sequences of samples;
   combining said plurality of sequences of samples into at least one united signal; wherein said combining comprises: detecting a respective data packet for each one of said plurality of sequences of samples to provide detected data packets; and
   based on an analysis of said at least one united signal, providing a signal indicative of repetitive information in the detected data packets, the detected data packets are carried by said data communication signal.

2. A method according to claim 1, wherein said combining further comprises:

using at least one of a preamble and a synchronization sequence of said detected data packets, calculating weights for combining said plurality of sequences of samples into a united signal of the at least one united signal; and forming a weighted linear combination of said plurality of sequences of samples and delayed versions of said plurality of said plurality of sequences of samples using said calculated weights.

3. A method according to claim 1, wherein said combining further comprises:
for each position in said at least one united signal, selecting a bit level having a highest probability of occurrence at said position based on a likelihood-ratio analysis of said detected data packets.

4. A method according to claim 1, wherein said combining further comprises:
performing symbol detection on said detected data packets to obtain respective symbol sequences; and
linearly combining said respective symbol sequences.

5. A method according to claim 1, wherein said combining further comprises:
decoding each of said detected data packets into respective bit sequences; and
for each position in said at least one united signal, selecting a bit level occurring in a majority of bits at said position in said respective bit sequences.

6. A method according to claim 1 further comprising:
collecting respective sets of sequences of samples of said data communication signal for each phase of a constant cycle of frequencies; wherein the at least one united signal comprises a plurality of united signals; and
forming a respective united signal of the at least one united signal for each of said sets of sequences of samples, said signal indicative of repetitive information being provided when repetitive information is detected in the at least one united signal.

7. A method according to claim 1 said method further comprising:
collecting respective sets of sequences of samples of said data communication signal for each phase of a plurality of cycles of frequencies; wherein the at least one united signal comprises a plurality of united signals; and
forming a respective united signal of the at least one united signal for each of said sets of sequences of samples, said signal indicative of repetitive information being provided when repetitive information is detected in the at least one of united signal.

8. A method according to claim 1, further comprising synchronizing said collecting to a detected data packet received from one of said first node and said second node.

9. A method according to claim 1, further comprising synchronizing said collecting to a detected request packet.

10. A method according to claim 1, further comprising synchronizing said collecting to a detected response packet.

11. A method according to claim 1, further comprising synchronizing said collecting to a cycle time of a plurality of detected data packets transmitted by at least one of said first node and said second node.

12. A non-transitory computer program product including computer program code, which, when executed by a processor, causes the processor to detect repetitive information in data packets communicated between a first node and a second node over a wireless network by:

collecting samples of a data communication signal transmitted between said first node and said second node over said wireless network at a plurality of respective times;
grouping said collected samples into a plurality of sequences of samples;
combining said plurality of sequences of samples into at least one united signal; wherein said combining comprises: detecting a respective data packet for each one of said plurality of sequences of samples; and
based on an analysis of said at least one united signal, providing a signal indicative of repetitive information in the detected data packets, the detected data packets are carried by said data communication signal.

13. A non-transitory computer program product according to claim 12, wherein said combining further comprises:
using at least one of a preamble and a synchronization sequence of said detected data packets, calculating weights for combining said plurality of sequences of samples into a united signal of the at least one united signal; and
forming a weighted linear combination of the plurality of said sequences of samples and delayed versions of said plurality of said sequences of samples using said calculated weights.

14. A non-transitory computer program product according to claim 12, wherein said combining further comprises:
and for each position in said at least one united signal, selecting a bit level having a highest probability of occurrence at said position based on a likelihood-ratio analysis of said detected data packets.

15. A non-transitory computer program product according to claim 12, wherein said combining further comprises:
performing symbol detection on said detected data packets to obtain respective symbol sequences; and
linearly combining said symbol sequences.

16. A non-transitory computer program product according to claim 12, wherein said combining further comprises:
decoding each of said detected data packets into respective bit sequences; and
for each position in said at least one united signal, selecting a bit level occurring in a majority of bits at said position in said respective bit sequences.

17. A non-transitory computer program product according to claim 12 including computer program code, which, when executed by the processor, causes the processor to detect the repetitive information in data packets communicated between the first node and the second node over the wireless network by:
collecting respective sets of sequences of samples of said data communication signal for each phase of a constant cycle of frequencies; wherein the at least one united signal comprises a plurality of united signals; and
forming a respective united signal of the at least one united signal for each of said sets of sequences of samples, said signal indicative of repetitive information being provided when repetitive information is detected in the at least one united signal.

18. A non-transitory computer program product according to claim 12 including computer program code, which, when executed by the processor, causes the processor to detect the repetitive information in data packets communicated between the first node and the second node over the wireless network by:
collecting respective sets of sequences of samples of said data communication signal for each phase of a plurality of cycles of frequencies; wherein the at least one united signal comprises a plurality of united signals; and forming a respective united signal of the at least one united signal for each of said sets of sequences of samples, said signal indicative of repetitive information being provided when repetitive information is detected in the at least one united signal.

19. A non-transitory computer program product according to claim 12, including computer program code, which, when executed by the processor, causes the processor to detect the repetitive information in data packets communicated between the first node and the second node over the wireless network by synchronizing said collecting to a detected data packet of the detected data packets, the detected data packet received from one of said first node and said second node.

20. A non-transitory computer program product according to claim 12, including computer program code, which, when executed by the processor, causes the processor to detect the repetitive information in data packets communicated between the first node and the second node over the wireless network by synchronizing said collecting to a detected request packet.

21. A non-transitory computer program product according to claim 12, including computer program code, which, when executed by the processor, causes the processor to detect the repetitive information in data packets communicated between the first node and the second node over the wireless network by: synchronizing said collecting to a detected response packet.

22. A non-transitory computer program product according to claim 12, including computer program code, which, when executed by the processor, causes the processor to detect the repetitive information in data packets communicated between the first node and the second node over the wireless network by synchronizing said collecting to a cycle time of a plurality of detected data packets transmitted by at least one of said first node and said second node.

23. A non-transitory computer program product according to claim 12, wherein said analysis comprises identifying a presence or absence of repetitive information in said at least one united signal, said signal indicative of repetitive information comprising an indicator of said identified presence or absence of repetitive information.

24. A non-transitory computer program product according to claim 12, wherein said analysis comprises extracting repetitive information from said at least one united signal, wherein said signal indicative of repetitive information comprises said extracted repetitive information.

* * * * *